United States Patent [19]

Sferrazza et al.

[11] Patent Number: 5,535,945

[45] Date of Patent: Jul. 16, 1996

[54] CARPET RECYCLING PROCESS AND SYSTEM

[75] Inventors: Randall A. Sferrazza, Arden; Alan C. Handermann, Asheville; Cecil H. Atwell, Brevard, all of N.C.; David K. Yamamoto, Paris, Canada

[73] Assignees: BASF Corporation, Mt. Olive, N.J.; Shred-Tech Limited, Cambridge, Canada

[21] Appl. No.: 395,506

[22] Filed: Feb. 27, 1995

[51] Int. Cl.⁶ .............. B02C 19/12; B02C 23/08
[52] U.S. Cl. .............. 241/24.12; 241/29; 241/791; 241/DIG. 38
[58] Field of Search .............. 241/24, 29, 79.1, 241/159, DIG. 38, 24.12

[56] References Cited

U.S. PATENT DOCUMENTS

| | | | |
|---|---|---|---|
| 3,843,060 | 10/1974 | Colburn | 241/24 |
| 4,028,159 | 6/1977 | Norris | 156/94 |
| 4,072,273 | 2/1978 | Reiniger | 241/24 |
| 4,158,646 | 6/1979 | Benkowski et al. | 260/2.3 |
| 5,145,617 | 9/1992 | Hermanson et al. | 264/37 |
| 5,169,870 | 12/1992 | Corbin et al. | 521/49.8 |
| 5,230,473 | 7/1993 | Hagguist et al. | 241/3 |
| 5,233,021 | 8/1993 | Sikorski | 528/491 |
| 5,294,384 | 3/1994 | David et al. | 264/37 |
| 5,431,347 | 7/1995 | Hayashi et al. | 241/23 |

Primary Examiner—John Husar
Attorney, Agent, or Firm—Nixon & Vanderhye

[57] ABSTRACT

Process and system for reclaiming polymeric fibers (e.g., nylon) from post-consumer carpeting includes shredding the post-consumer carpeting into strips, dismantling the carpet strips to form a mixture of the fibers to be reclaimed and the backing material to be discarded, and then separating a substantial portion of the fibers from the backing material. Preferably, the carpet strips are dismantled by impacting the strips of carpeting against an anvil structure with hammer elements using, e.g., a hammermill. A secondary reclamation system is provided whereby the separated backing material which may contain some fibers bound thereto is subjected to secondary dismantling and separation operations. The fractions obtained from the primary and secondary separation operations containing predominantly the polymeric fibers may thus be combined so as to form a process discharge stream which can be pelletized and/or baled as desired.

25 Claims, 7 Drawing Sheets

CARPET RECYCLING PROCESS AND SYSTEM

FIELD OF INVENTION

The present invention relates generally to the reclamation of post-consumer waste carpet. More particularly, the present invention relates to processes and systems whereby a substantial portion of the synthetic polymeric carpet fibers may be separated mechanically and physically from other carpet components so that the synthetic fibers may be recycled.

BACKGROUND OF THE INVENTION

Nylon carpeting (i.e., carpeting having nylon-6 and/or nylon-6,6 fibers tufted into a non-nylon backing material) is an extremely popular flooring material for residential and commercial buildings. Although quite durable, nylon carpeting does have a finite useful life and therefore must be replaced at periodic intervals in order to maintain the interior aesthetics of the residential or commercial building in which it is installed. Once the used carpeting has been removed, it has typically been discarded as post-consumer landfill waste. Needless to say, reducing (or eliminating) the vast amount of post-consumer carpeting that is discarded annually as landfill waste is quite attractive to both the landfill operators (since the strain on landfill capacity can be reduced) and nylon processors (since waste carpeting represents a potentially large source of low-cost nylon raw material).

Recycling of nylon carpeting, however, is problematic since its three basic components—i.e., nylon carpet fibers, at least one backing material formed typically from polyolefins, such as polypropylene, and an adhesive material of styrene-butadiene rubber (SBR) applied as a latex and typically filled with an inorganic filler such as calcium carbonate—are chemically and physically diverse. Thus, in order to be economically viable, the art has typically sought ways in which these three basic carpeting components could be separated and isolated from one another so that the commercially valuable nylon carpet fibers can be recycled.

As examples of prior art techniques that have been proposed to reclaim carpeting, the reader's attention is directed to the following U.S. Patents (the entire content of each being incorporated expressly hereinto by reference) which are believed to be representative of this art area:

| U.S. Pat. No. | Patentee | Issue Date |
| --- | --- | --- |
| 5,230,473 | Hagguist et al | Jul. 27, 1993 |
| 5,233,021 | Sikorski | Aug. 3, 1993 |
| 5,294,384 | David et al | Mar. 15, 1994 |
| 5,169,870 | Corbin et al | Dec. 8, 1992 |

The Hagguist et al '473 patent describes a carpet reclamation system whereby the waste carpeting is subjected to a series of mechanical, hydraulic, fluid, heat and pressure devices so as to separate the carpeting into its basic components which are individually collected.

Polymeric materials are extracted from a multi-component product, such as carpeting, by subjecting the multi-component product to a multi-stage extraction process according to the Sikorski '021 patent. Specifically, according to the Sikorski '021 patent, since each polymer material component of the mixture has a different range of temperatures and pressures at which it is soluble in a given super-critical fluid, the material may be treated by adjusting the temperature and pressure of a suitable fluid so that the fluid becomes supercritical in order to solubilize that component in the mixture having the lowest range of solubility temperatures and pressures. By removing the polymer-containing solution and again treating the remaining components of the mixture in a suitable fluid and under suitable pressure/temperature conditions, the remaining components may be removed and separated in a step-wise manner.

The technique proposed by the David et al '384 patent does not attempt to separate the waste carpeting components. Instead, the David et al '384 patent suggests that the entirety of the waste carpeting may be formed into a melt blend under conditions of temperature, pressure and intensive mixing sufficient to produce a heterogeneous composition which exhibits thermoplastic properties which is said to be useful "as is" in a variety of applications.

The Corbin et al '870 patent discloses a process whereby ϵ-caprolactam may be reclaimed from nylon-6 carpet waste. Specifically, according to the Corbin et al '870 patent, it is not essential that most of the polypropylene, latex and other non-nylon carpeting components be separated from the nylon component. Thus, the process of Corbin et al '870 is capable of tolerating the presence of non-nylon carpeting components such as the polypropylene backing, calcium carbonate-containing latex and the like, while still producing ϵ-caprolactam which contains only those impurities derived from the nylon-6 component.

SUMMARY OF THE INVENTION

The present invention broadly provides for the reclamation of polymeric fibers from post-consumer carpeting comprised of such fibers bound to a backing material. In this regard, although the present invention may reclaim virtually any polymeric fiber types associated with post-consumer carpeting, it is particularly advantageous when employed to reclaim nylon from post-consumer carpeting containing nylon carpet fibers bound to non-nylon backing material. Therefore, although the term "nylon" and like terms will be used hereinafter to describe the reclaimed carpet fibers, it will be appreciated that such a description represents a presently preferred embodiment of this invention and is non-limiting.

According to the present invention, post-consumer carpeting in roll or sheet form is shredded into strips. These strips are then subjected to at least one dismantling operation which maintains substantially the integrity of the nylon fibers intended to be reclaimed, but reduces (comminutes) the relatively more brittle backing material. That is, according to the present invention, the backing material is substantially removed from the carpeting structure without substantial cutting of the fibers. Preferably, the dismantling operation is such that the carpet strips are impacted against an anvil structure (e.g. serrated cutter bars) by hammer elements so as to dismantle and dislodge a substantial portion of the backing material.

In a particularly preferred embodiment of this invention, the dismantled strips of post-consumer carpeting are granulated so as to form a particulate mixture comprised of nylon fiber particulates and backing material particulates. The particulate mixture is introduced into a primary air elutriator to separate the particulate mixture into a primary light fraction predominantly comprised of nylon particulates and a primary heavies fraction predominantly comprised of backing material particulates. The primary light fraction is transferred to a primary screening operation to separate substantially any remaining backing material particulates contained therein from the nylon particulates and obtain a primary screening discharge stream comprised predominantly of the separated nylon particulates.

The primary heavies fraction meanwhile is subjected to a secondary dismantling operation to dismantle substantially any nylon fibers remaining bound to the backing material therein and form a secondary loose heterogeneous mixture of nylon and backing material particulates. The secondary loose heterogenous mixture is introduced into a secondary air elutriator to form a secondary light fraction predominantly comprised of nylon particulates and a secondary heavies fraction predominantly comprised of backing material particulates. This secondary light fraction is transferred to a secondary screening operation to separate substantially any remaining backing material particulates contained therein from the nylon particulates and obtain a secondary screening discharge stream comprised predominantly of such separated nylon particulates. The primary and secondary screening discharge streams are thereafter combined, whereby a substantial portion of nylon obtained from nylon fibers of said post-consumer carpeting is reclaimed.

Further aspects and advantages of this invention will become more clear after careful consideration is given to the following detailed description of the preferred exemplary embodiments thereof.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
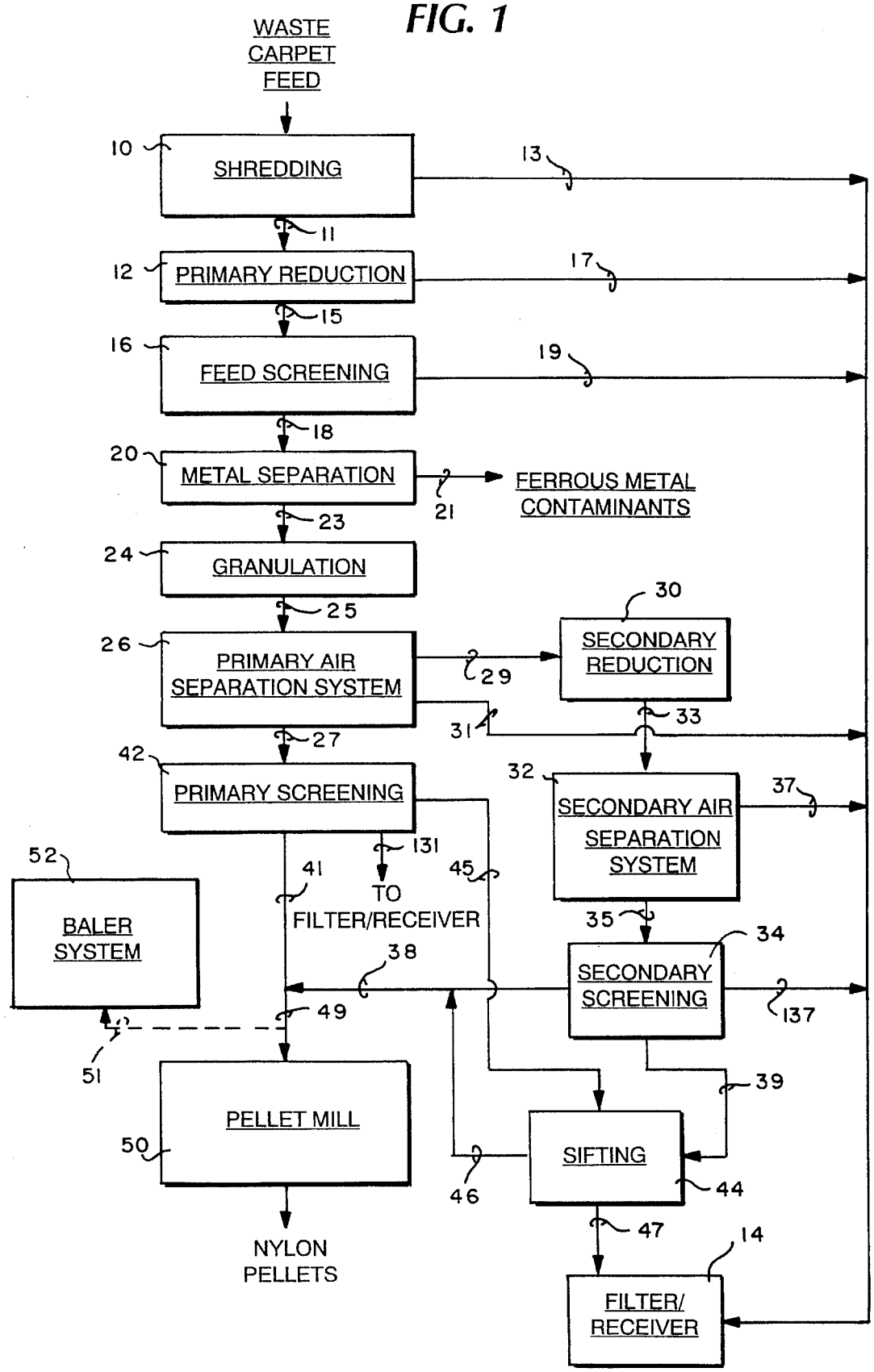
FIG. 1 is a schematic block flow diagram showing the basic processing steps according to the present invention.
Figure 2A:
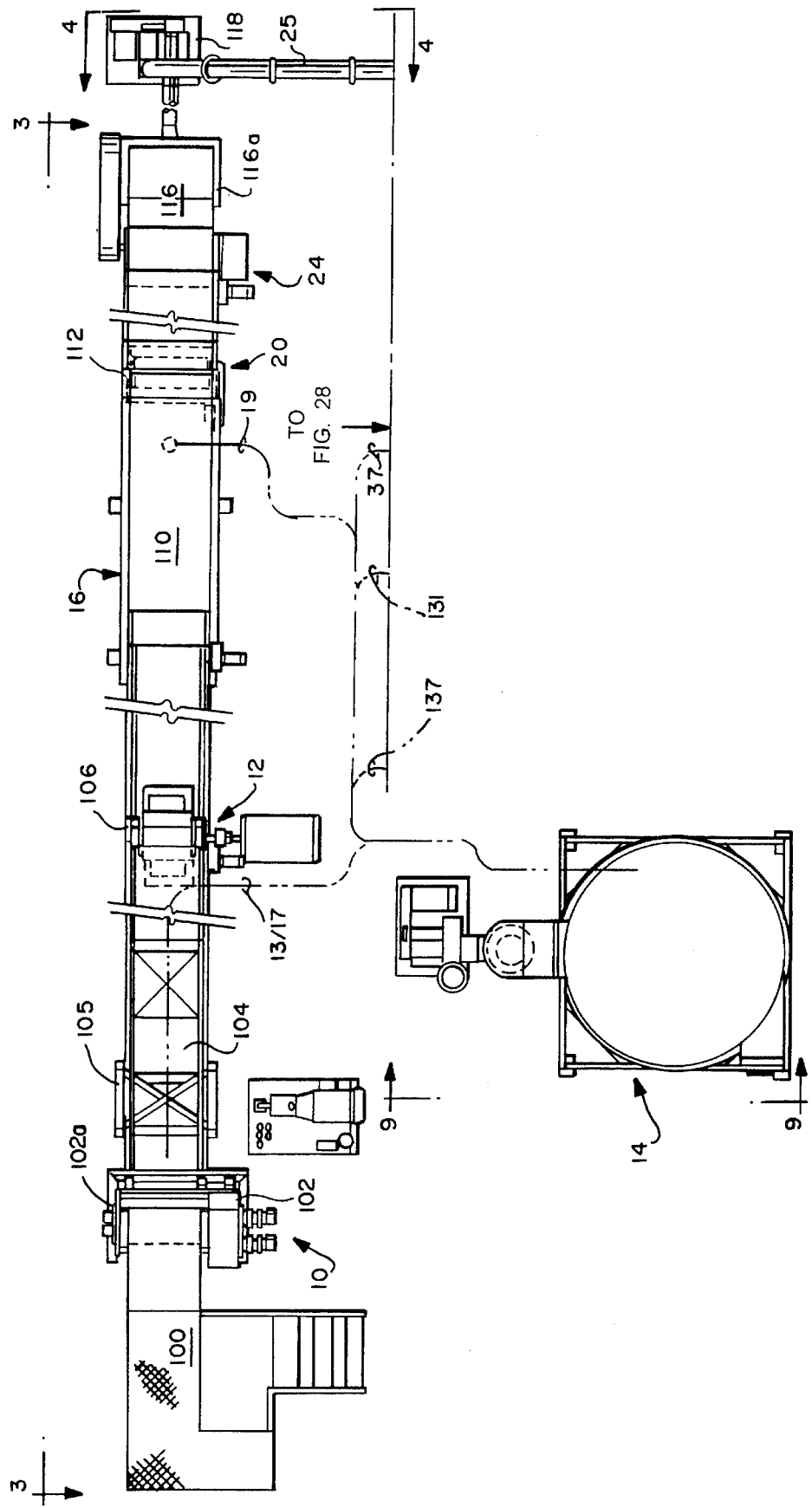
FIGS. 2A and 2B are plan views showing a preferred equipment layout for the various unit operations forming a part of this invention.
Figure 2B:
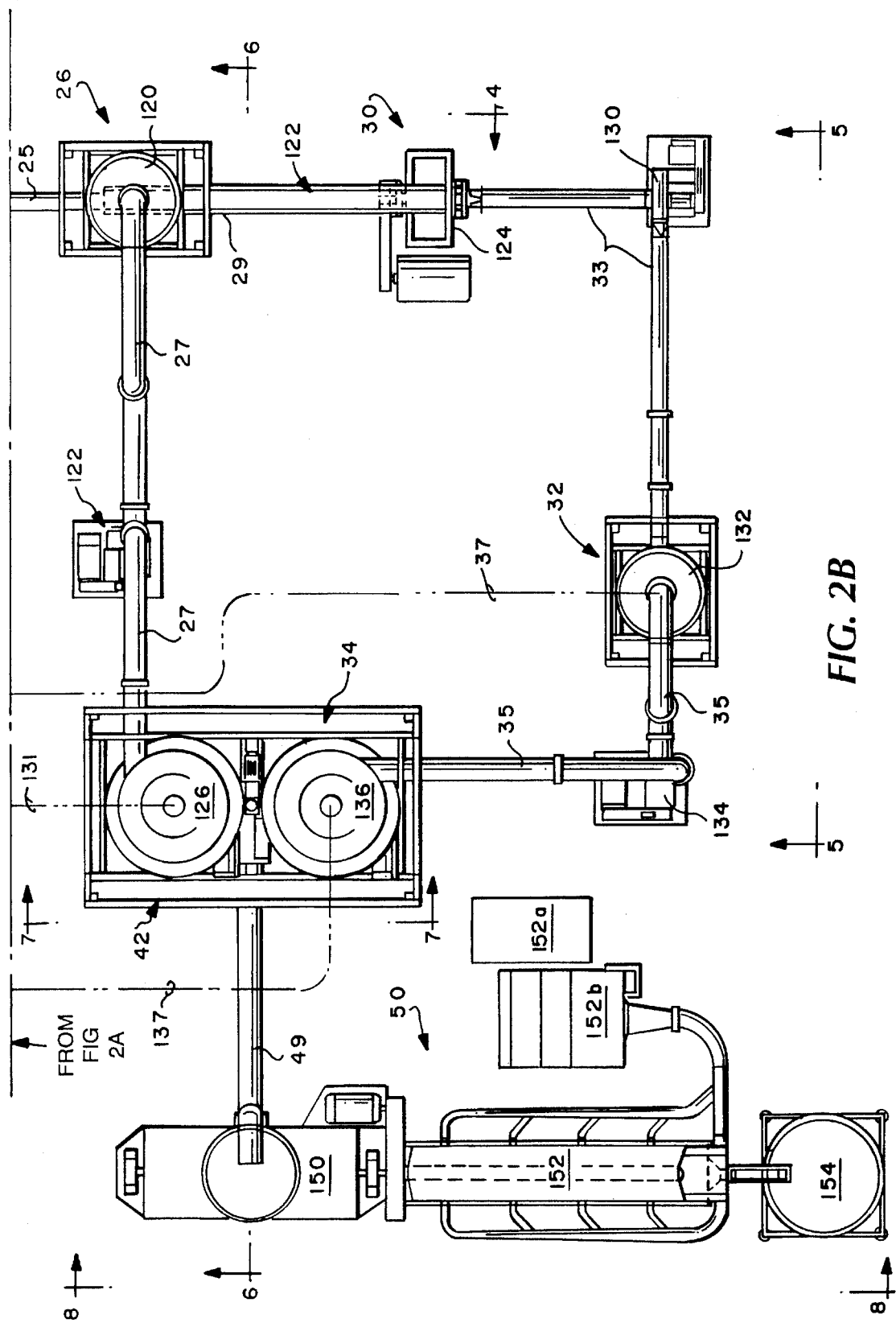
Figure 3:
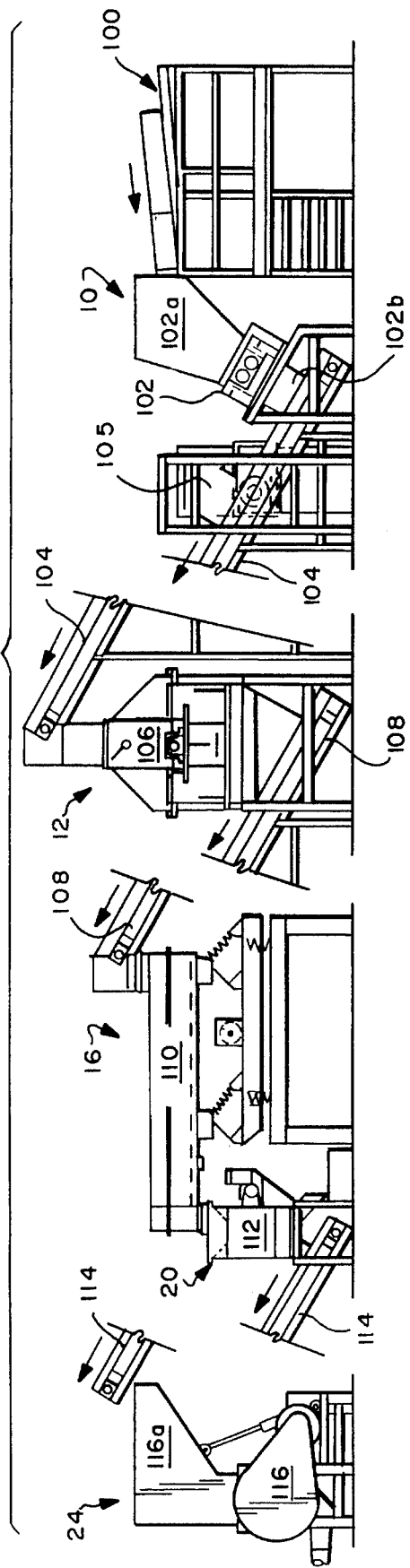
FIG. 3 is an elevational view of the equipment layout depicted in FIG. 2A as taken along line 3—3 therein.
Figure 4:
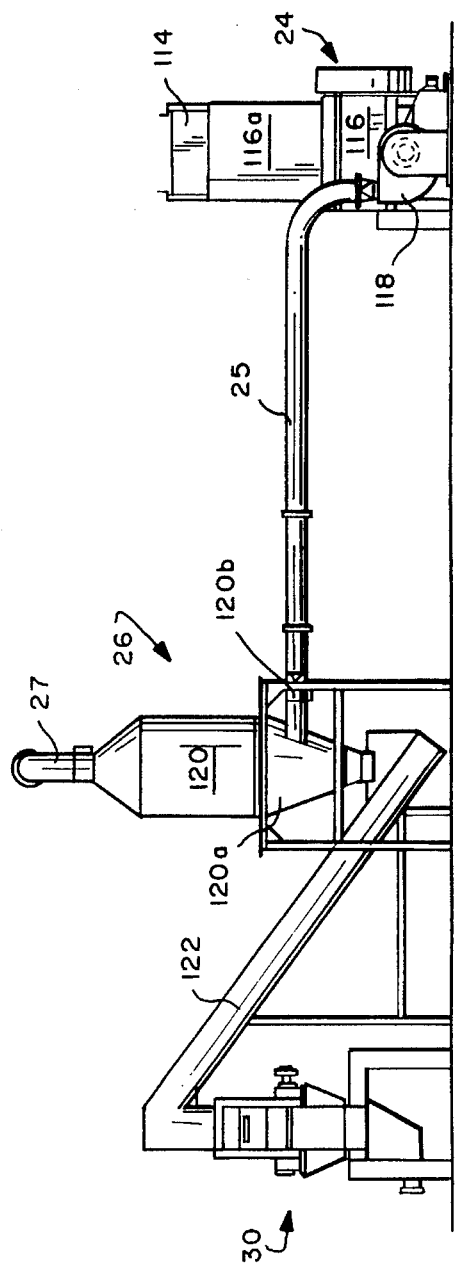
FIG. 4 is an elevational view of the equipment layout depicted in FIGS. 2A and 2B as taken collectively along line 4—4 therein.
Figure 5:
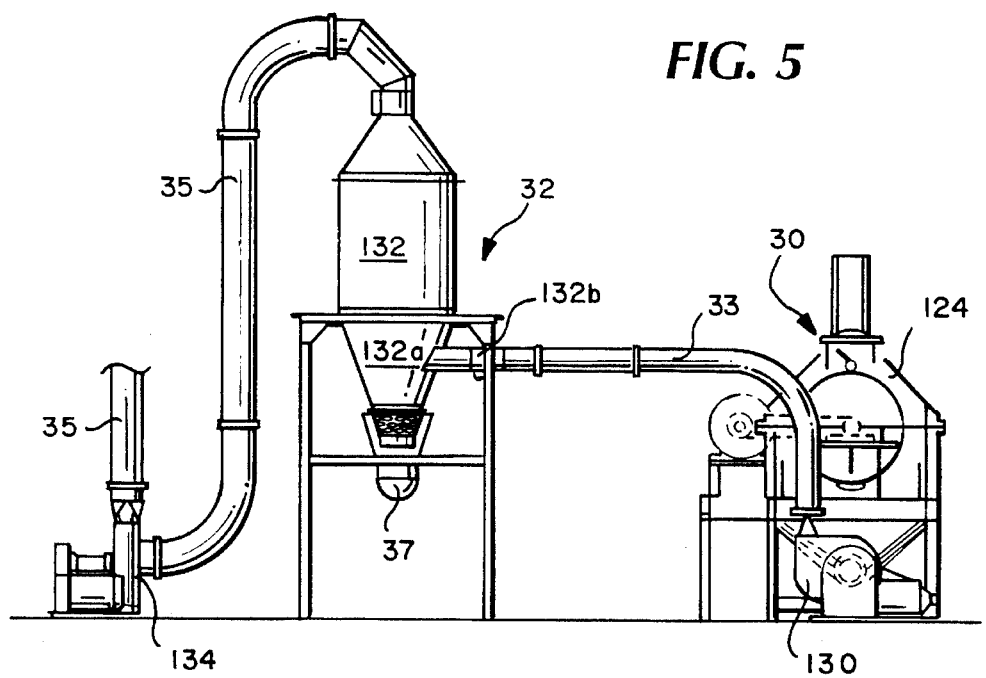
FIG. 5 is an elevational view of the equipment layout depicted in FIG. 2B as taken along line 5—5 therein.
Figure 7:
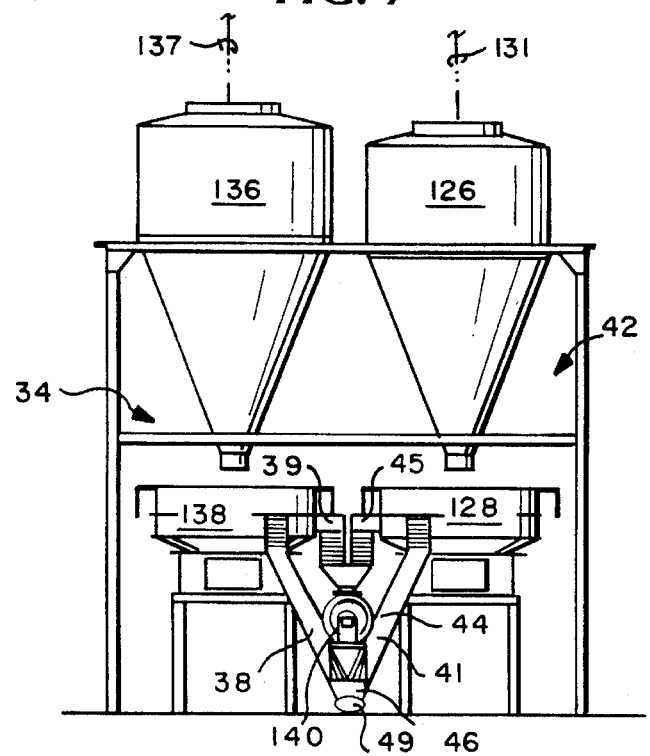
FIG. 7 is an elevational view of the equipment layout depicted in FIG. 2B as taken along line 7—7 therein.
Figure 6:
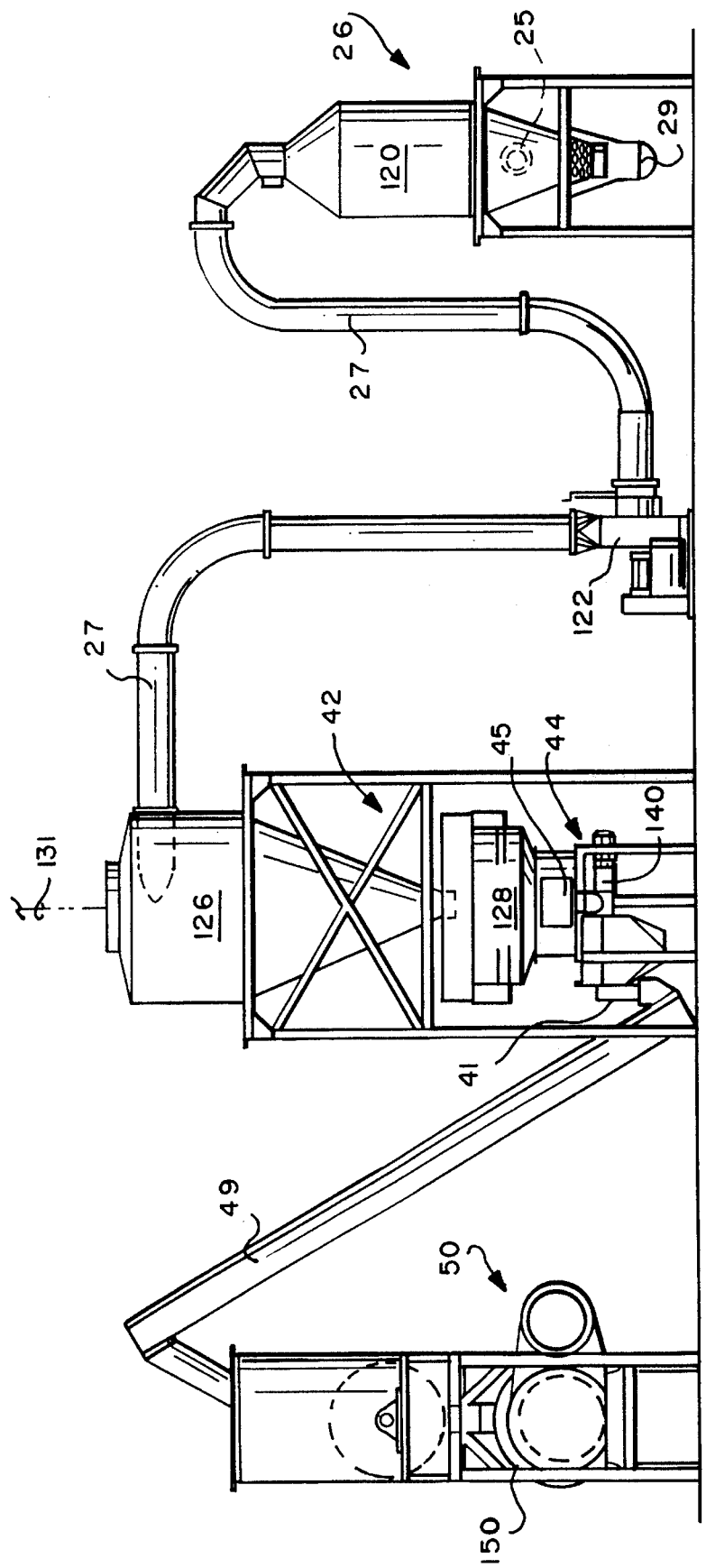
FIG. 6 is an elevational view of the equipment layout depicted in FIG. 2B as taken along line 6—6 therein.
Figure 8:
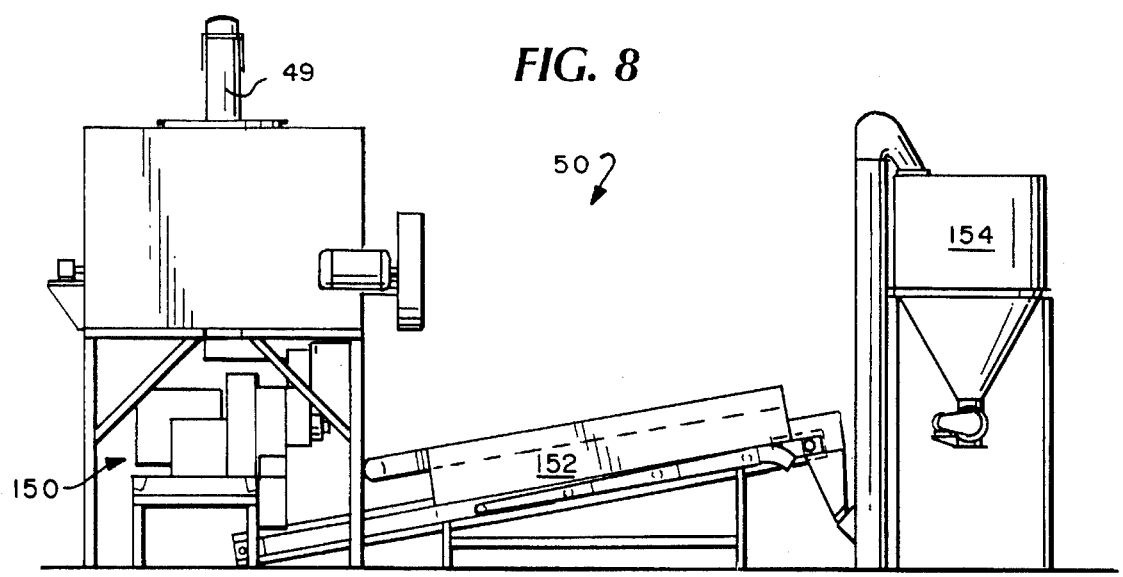
FIG. 8 is an elevational view of the equipment layout depicted in FIG. 2B as taken along line 8—8 therein.
Figure 9:
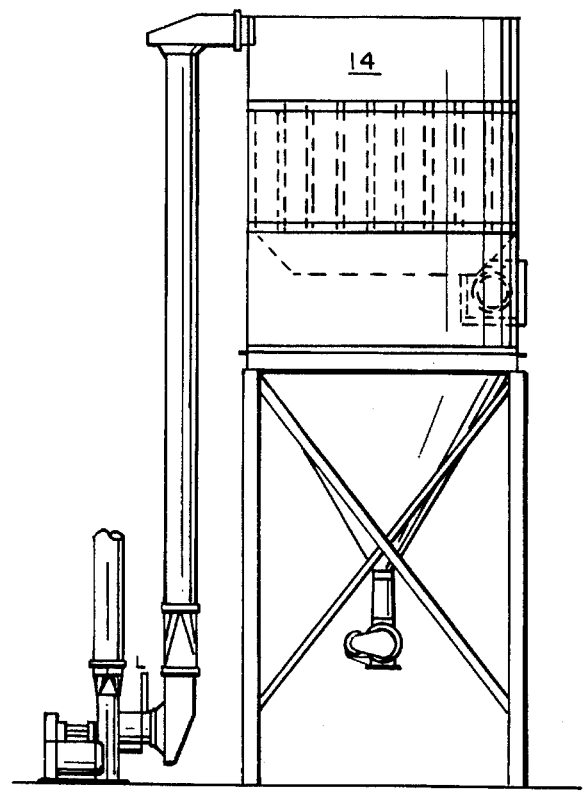
FIG. 9 is an elevational view of the equipment layout depicted in FIG. 2A as taken along line 9—9 therein.

The basic processing steps of the present invention are shown schematically in accompanying FIG. 1. In this regard, the post consumer (i.e., waste) carpeting in baled or rolled form is first shredded in step 10 so as to form strips of the waste carpeting which are nominally about 1¼ wide by between about 1" to 10" long and having a bulk density of approximately 8.5–9 lb/ft³. The waste carpet fed into the shredding step 10 can be virtually any commercial synthetic (polymeric) carpet. Preferably, however, the waste carpet feed is nylon carpet—i.e., a carpet material having tufts of nylon fibers, such as nylon-6 or nylon 6,6—composed generally, based on the total weight of the waste carpet, of about 50 wt. % nylon, about 12 wt. % polypropylene backing, and about 8 wt. % SBR latex adhesive containing about 30 wt. % of calcium carbonate filler material.

The waste carpet strips are then transferred to a primary reduction station 12 via line 11, while dust generated during the shredding operation is transferred via line 13 to a central filter/receiver station 14. The primary reduction station 12 mechanically dismantles integral structure of the waste carpet strips. That is, the primary reduction station 12 serves to dismantle substantially the nylon fiber tufts from the polypropylene backing material and the calcium carbonate-filled SBR latex adhesive (hereinafter sometimes more simply referred to as the "backing material") so as to facilitate the downstream separatory unit operations.

A heterogeneous mix of nylon and backing material is then fed from the reduction operation 12 via line 15 to a feed screening operation 16, while dust produced during the reduction operation 14 is transferred via line 17 to the filter/receiver station 14. The feed screening operation 16 serves as a preliminary separatory stage for the heterogeneous mix of components discharged from the reduction stage 14. More specifically, the feed screening operation 16 produces an overs stream 18 comprised predominantly of nylon carpet tufts and an unders stream 19 comprised predominantly of backing material. The overs stream 18 is transferred to a metal separation operation 20 which removes via line 21 any ferrous metal contaminants (e.g., carpet staples, tacks, baling wire and the like) that may be present.

A ferrous metal-free over stream 23 is discharged from the metal separation operation 20 and fed to a granulation stage 24. The granulation stage 24 serves to further reduce the nominal size of the heterogenous mix of carpet component predominantly comprised of nylon (e.g., containing between about 40 to about 70 wt. % nylon) to less than about ¼" and obtain a bulk density of the heterogenous mix of about 3 lb/ft³. The granulated heterogenous mix of carpet components is then fed via line 25 to a primary air separation system 26.

The granulated heterogenous mix of carpet components fed into the primary air separation system 26 is separated into carpet component fractions. That is, the primary air separation system 26 serves to separate the carpet fractions into a primary light fraction containing predominantly nylon and fine backing materials (typically between about 55 to about 75 wt. % nylon with the remainder being fine backing materials) and a primary heavy fraction containing predominantly the heavy granules of backing material typically bonded to a meaningful amount of nylon. Thus, the primary heavy fraction will typically contain between about 35 to about 55 wt. % nylon. The primary light fraction is transferred via stream 27 to a primary screening operation 28, while the primary heavy fraction is transferred via stream 29 to a secondary reduction operation 30. Dust fines generated during the primary air separation is discharged from the system 26 via line 31 to the central filter/receiver 14.

As noted briefly above, although the primary heavy fraction discharged from the primary air separation system 26 is comprised predominantly of carpet backing components, there is still a meaningful amount of nylon (e.g., between about 35 to about 55 wt. %) that is present in the fraction which would be desirable to reclaim. The nylon in the primary heavy fraction, however, typically is integral bonded to the carpet backing particles instead of being loosely associated therewith. Therefore, the secondary reduction operation 30 serves to dismantle the relatively large and heavy carpet backing particles by subjecting them to impact size reduction. The dismantled heavy carpet backing material will therefore produce a loose mixture of further comminuted carpet backing material and nylon which is fed via line 33 to a secondary air separation system 32.

The secondary air separation system 32, like the primary air separation system 26 described briefly above, serves to separate the loose mixture of carpet backing material and nylon discharged from the secondary reduction operation 30 into a secondary light fraction comprised predominantly of nylon (typically between about 45 to about 65 wt. % nylon) which is transferred to a secondary screening operation 34 via line 35, and a secondary heavy reject fraction which is transferred via line 37 to the central filter/receiver 14. The secondary screening operation 34 receives the secondary light fraction from the secondary reduction operation 30 and separates it into a secondary overs stream 38 which is comprised predominantly of nylon particulates (between about 60 to about 80 wt. % nylon) and a secondary unders stream 39 which is comprised predominantly of fine backing material particulates (but includes a minor amount between about 30 to about 50 wt. % of nylon particulates).

The secondary overs stream 38 is passed on to and combined with the primary overs stream 41 comprised predominantly of nylon particulates (between about 70 to about 85 wt. % nylon) which is discharged from the primary screening operation 42. The secondary unders stream 39 meanwhile is fed to a sifting operation 44 along with the primary unders stream 45 comprised predominantly of backing material particulates (but includes a meaningful amount between about 40 to about 60 wt. % of nylon particulates) discharged from the primary screening operation 42. The sifting operation 44 thus receives the fine backing material particulate streams 45 and 39 from the primary and secondary screening operations 42, 34, respectively, so as to separate a major portion of the nylon particulates loosely mixed therewith. The accepts stream 46 of nylon particulates is thus discharged from the sifting operation 44 and combined with the overs stream 38 discharged from the secondary screening operation, while the rejects stream 47 of fine backing material particulates is transferred to the central filter/receiver 14 for collection.

The combined streams 41, 38 (i.e., stream 49) will contain at least about 65 wt. %, more preferably at least about 80 wt. %, and most preferably between about 75 to about 85 wt. % of nylon particulates. The nylon particulates may thus be directed to a pellet mill system 50 which forms, cools, conveys and discharges solid pellets containing the nylon reclaimed via streams 41, 38. Optionally (or alternatively) at least a portion (or the entirety) of streams 41, 38 (combined as stream 49) may be passed to a baler system 52 via line 51 which densifies the nylon particulates in the form of compacted bales of between about 500–600 lbs. These bales may also be wrapped or deposited in a suitable container for transport.

Accompanying FIGS. 2A–2B and 3–9 depict a presently preferred equipment layout for the carpet recycling system according to this invention. In this regard, the various steps/operations described above with reference to FIG. 1 are likewise identified generally in FIGS. 2A–2B and 3–9 by the same reference numerals employed therein even though the individual equipment that may be included within a particular step/operation has been identified by separate reference numeral(s).

As is shown, post-consumer carpet feed material to be reclaimed is delivered onto an operator-manned feed platform 100 which directs the carpet feed material into the hopper 102a of an industrial shredder 102. The carpet feed material may be baled bundles of loose carpet scraps and/or rolls of carpeting. The bales of carpet scraps may have a bulk density of between about 14–17 lb/ft$^3$, with the carpet scraps being up to about 4 ft. in width and a length of typically about 6 ft. The operator stationed at platform 100 will break the bale, dispose of the baling wire and load the shredder hopper 102a with multiple layers of carpet scraps via guide 100a. The number of carpet layers can vary between 1 to about 14, with an average of about 8 carpet scrap layers being preferred. If rolled carpet material is employed, the rolls will typically be about 14" in diameter and cut to have a length of between about 6 to about 7 ft. so that the operator may feed the roll lengthwise into the shredder hopper 102a.

Although virtually any conventional industrial shredder having a pair of counter-rotational shafts carrying interleaved cutter discs and cleaning fingers may be employed in the practice of this invention, the preferred shredder is ST-50 Series of industrial shredders commercially available from Shred-Tech Limited of Cambridge, Ontario, Canada. Most preferred, however, is the industrial rotary shredder disclosed in copending U.S. patent application Ser. No. 08/394, 348 still pending filed even date herewith, the entire content of which is incorporated expressly hereinto by reference.

The shredded waste carpet material (nominally about 1¼" wide x between 1 to 10" long) is discharged from chute 102b of the shredder 102 onto a hammermill feed conveyor 104 and passes beneath a ferrous metal trap 105 (i.e., a permanent magnet) for removing ferrous metal therefrom. The conveyor 104 feeds a rotary hammermill 106 at the primary reduction station 12. The hammermill 106 is conventional in that it includes a center-feed housing containing a rotor comprised of concentrically stacked flywheel discs. A series of non-swinging elongate hammer bars are fixed to the rotor via hammer pins and are positioned parallel to the rotational center axis of the rotor, but disposed in circumferentially spaced relationship about the flywheel discs. Anvil structures—e.g., serrated cutter bars having square or rectangular protrusions that are disposed parallel to the axis of the hammermill rotor, and defining an open center discharge—are positioned below but spaced from the rotor. Therefore, upon rotation of the rotor at relatively high speed (e.g., about 1800 RPM), the elongate hammer bars will impact the carpet strips against the fixed anvil structures. This continual impact by the hammer bars will therefore serve to substantially dismantle the carpet strips—i.e., a substantial portion of the carpet backing material will be removed from the nylon fiber tufts. One particularly preferred hammermill is the Aristocrat Series 40 of Gruendler Crushers by Simplicity Engineering, Inc. of Durand, Mich.

The dismantled carpet strips are discharged from the hammermill 106 as a heterogeneous mixture of the nylon carpet tufts and the backing material which has a bulk density of about 2 to about 5 lb/if$^3$, and typically about 3 lb/ft$^3$. The mixture is deposited onto a conveyor 108 which transports it to the feed end of a vibratory screen 110 at the feed screening stage 16. The vibratory screen 110 provides for maximum removal of reject dust, grit and calcium carbonate powder with minimal loss of nylon from the heterogeneous mixture. One preferred commercially available vibratory screen that may be used is Model No. KDSN BD-36-SD from the Kinergy Corporation.

The unders discharge comprised of the reject dust, grit and calcium carbonate powder is typically between about 10 to about 15%, usually about 12.5% of the average system feed rate and exhibits a bulk density of between about 55 to about 65 lb/ft$^3$ (usually about 60 lb/ft$^3$). The remainder of the mixture, that is the overs discharge from the vibratory screen 110, will have a bulk density of between about 2.0 to about 3.0 lb/ft$^3$ (usually about 2.6 lb/ft$^3$) and is fed into a drum separator 112 at the metal separation step 20.

The drum separator 112 includes a stationary core, one portion of which is a permanent magnet and the remaining portion being formed of a non-magnetic material, and a revolving shell concentrically surrounding the core in spaced relation thereto. Feeding the material onto the revolving shell will magnetically trap magnetic material thereagainst. The trapped magnetic material will thus be held onto the surface of the shell until it is rotated to a region not under the influence of the magnetic field, where it will then fall into the magnetic discharge chute. In such a manner, therefore, the nylon/backing material mixture will be discharged from the seaparator 112 free of any ferromagnetic material that may be present in the overs discharge from the vibratory screen 110. One preferred drum separator is the Type A Erium™-Powered permanent magnetic drum separator commercially available from Eriez Magnetics of Ontario, Canada.

The metal-free nylon/backing material mixture discharged from the drum separator 112 is discharged onto a conveyor 114 which transports it to the feed hopper 116a of a granulator 116 at the granulation step 24. The granulator 116 serves to reduce the nylon and backing material mixture discharged as an overs stream from the vibratory screen 110 into particulates having an average particle size of about ¼" screen mesh (i.e., the particles are capable of passing through a mesh screen having a nominal aperture size of ¼"). The bulk density of the particulate nylon/backing material mixture discharged from the granulator 116 will between about 2.5 to about 3.5 lb/ft$^3$ (usually about 3.0 lb/ft$^3$). The granulator 116 will preferably include a herringbone "V" open rotor having a series of scissor-action cutting knives, similar to the commercially available granulator Model No. 2442H from Rapid Granulator, Inc. of Rockford, Ill. Another granulator that may be employed in the practice of this invention which has a precision knife mounting arrangement that permits very accurate kinfe gap adjustment and gap tolerance (e.g., between 0.002" to about 0.003") for efficient cutting of fiber and film type materials is the Model DSF 1530 commercially available from Sprout-Bauer, Inc. of Muncy, Pa.

The granulated nylon/backing material particulate mixture is pneumatically conveyed via a feed blower unit 118 to the primary air elutriator unit 120. Since the nylon particulates and the backing material particulates have different densities and aerodynamic characteristics, the primary air elutriator unit 120 functions to separate the nylon/backing material particulates which are fed via perpendicularly (relative to the vertical axis of unit 120) via line 25 into the base 120a of the unit 120. That is, the unit 120 serves to separate the mixture fed via line 25 into primary light and heavies fractions. The primary light fraction contains predominantly nylon particulates and a minimal amount of backing material particulates (preferably between about 55 to about 75 wt. % nylon particulates) and is pneumatically discharged from the unit through line 27 via discharge blower unit 122. In order to dissipate/neutralize static electricity that may build up within the unit 120 and thereby ensure proper fractional separation, the unit 120 is most preferably provided with a conventional ionizer 120b (e.g., commercially available from Simco, an Illinois Tool Works Company) in line 25 on the input side of elutriator base 120a.

The primary heavies fraction, on the other hand, contains predominantly backing material particulates with a meaningful amount of nylon particulates still bonded thereto. The primary heavies fraction is discharged from the elutriator base 120a into a feed auger conveyor 122 which transports the primary heavies fraction to a secondary hammermill 124 at the secondary reduction step 30. In this regard, it will be appreciated that, although the primary heavies fraction contains a predominant amount of backing material particulates, a meaningful amount of nylon particulates is incorporated therein. In this regard, much of the nylon particulates contained In the primary heavies fraction is physically bonded to backing material particulates (e.g., due to incomplete dismantling of the carpet structure in the primary hammermill 106 and/or granulator 116). Thus, the secondary hammermill 124 serves to impact the particulates in the secondary heavies fraction to dismantle a substantial portion of any remaining nylon particulates that may still be integrally associated with backing material. As a result, the further comminution and dismantling of the particulates within the secondary hammermill 124 results in a substantial portion of the nylon particulates in the primary heavies fraction being physically freed from backing material to allow separation thereof. The secondary hammermill 124 is functionally identical to the primary hammermill 106 discussed above, but may be smaller capacity and/or operated at a lesser rate (e.g., about 1200 RPM) due to the lesser quantity of material that is required to be processed.

The primary light fraction discharged from the air elutriator 120 is transported pneumatically through line 27 to the primary screening operation 42 comprised mainly of a cyclone separator 126 and a primary vibratory screen 128. The cyclone separator 126 removes fine dust particulates from the stream 27. The removed dust particulates are then pneumatically transferred via line 131 to the central filter/receiver unit 14. The remainder of the relatively heavier particulates is discharged from the cyclone 126 onto the feed end of the primary vibratory screen 128.

Meanwhile, the further dismantled particulate mixture comprised of backing material particulates and a minor portion of loose nylon particulates is pneumatically conveyed through line 33 via blower unit 130 to the secondary air separation system 32 which includes a secondary air elutriator unit 132. In the secondary air elutriator unit 132, the nylon particulate component will be removed as a secondary light fraction via line 35 and transported pneumatically by blower unit 134 to the secondary screening operation 34. The predominant backing material particulates, on the other hand, will be removed from the secondary elutriator 32 as a heavies fraction and transported via line 37 to the central filter/receiver unit 14. Similar to the primary air elutriator unit 120 discussed above, the secondary air elutriator 132 preferably includes an in-line ionizer 132b mounted in line 33 at the input side of the cyclone base 132a so as to neutralize static charge build-up and permit the desired separatory functions to be achieved.

Like the primary screening system 42, the secondary screening system 34 is comprised mainly of a cyclone separator 136 and a secondary vibratory screen 138. The cyclone separator 136 removes fine dust particulates from the stream 35. The removed dust particulates are then pneumatically transported via line 137 to the central filter/receiver unit 14. The remainder of the relatively heavier particulates is discharged from the cyclone 136 onto the feed end of the secondary vibratory screen 138.

Preferably, each of the primary and secondary vibratory screens 128, 138, respectively, impart adjustable, multi-plane, mechanical inertial vibrations to the material being screened. Most preferably, the screens 128, 138 are circular horizontally disposed vibratory screens having eccentrically rotatable upper and lower weights, the former imparting a horizontal "throw" to the screen, and the latter imparting a high frequency tilt to the screen frame so as to assist in moving material across the screen surface. Such screens are in and of themselves well known and commercially available, for example Model No. K80-(1K)-CS from Kason Corporation of Linden, N.J.

The primary and secondary vibratory screens 128 and 138, respectively, are preferably positioned adjacent one another (see, for example FIG. 7) so as to more easily permit the accepts (overs) fraction of each screen to be merged via chutes 38, 41 to a common line 49. The rejects (unders) fraction of each screen 128, 138, on the other hand, is directed via lines 45, 39, respectively, to a centrifugal sifter 140 (Model MO-CS Centri-Sifter™ centrifugal sifter commercially available from Kason Corporation of Linden, N.J.) comprising the sifting stage 44. The sifter 140 will thus provide a further separation to obtain any residual nylon particulates that may be present in the rejects fraction. The residual nylon particulates discharged as the oversize fraction from the sifter 140 are therefore transported via line 46 to be combined with lines 38 and 41, while the undersize (tailings) fraction will be discharged from the sifter 140 and transported pneumatically to the central filter/receiver 14 via a pneumatic line not shown.

The reclaimed nylon fiber particulates from the separatory unit operations described above are transferred through line 49 which encloses a suitable conveyor (e.g., an auger conveyor) to a pellet mill operation 50. The pellet mill operation 50 is comprised mainly of a pellet mill unit 150, a cooling conveyer 152 (with its associated chiller unit 152a and chilled air handling unit 152b), and a pellet storage silo 154. The various unit operations included in the pellet mill operation 50 are conventional and may be obtained commercially. For example, the pellet mil 150 may be an industrial Pellet Ace™ Model No. 500P available from the Andritz Sprout-Bauer, Inc. of Muncy, Pa., while the chiller and air handling units 152a, 152b may be Model Nos. PA10 and BAH-107, respectively, from Berg Chilling Systems Inc. of Wood Dale, Ill. The pellets obtained from the pellet mill operation 50 may be used for a variety of purposes. For example, the pellets may be used "as is" or combined with virgin nylon material and molded to form thermoplastic products. Preferably, however, the pellets are used as a feed material to reclaim ε-caprolactam according to the process disclosed in the above-cited Corbin et al '870 patent.

Alternatively (or additionally) the reclaimed nylon particulates may be baled for transportation to a remote processing site for further processing (e.g., for use as a feed material to reclaim ε-caprolactam according to the Corbin et al '870 patent, to be pelletized, or the like). In such a situation, a conventional baler system 52 (see FIG. 1) may be employed, such as the strapless horizontal fiber baler system commercially available from Fishburne International of Arden, N.C.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for reclaiming polymeric fibers from carpeting having polymeric fiber tufts bound to a backing material, said process comprising the steps of:
   (a) shredding the carpeting into strips;
   (b) impacting said carpeting strips against an anvil structure with hammer elements so as to dismantle substantially said carpeting strips and form a heterogeneous mixture loosely comprised of said polymeric fiber tufts and said backing material;
   (c) granulating the heterogeneous mixture to form a particulate mixture of polymeric fiber particulates and backing material particulates; and
   (d) separating said polymeric fiber particulates from said backing material particulates.

2. A process as in claim 1, wherein step (b) is practiced using a rotary hammermill.

3. A process as in claim 1, wherein step (c) includes the step of introducing said heterogeneous mixture to a primary air elutriator to separate said mixture into a primary light fraction predominantly comprised of said polymeric fibers and a primary heavies fraction predominantly comprised of said backing material.

4. A process as in claim 3, further comprising the steps of:
   (i) impacting said primary heavies fraction obtained from said primary air elutriator against an apertured anvil plate with hammer elements so as to dismantle substantially any polymeric fibers remaining bound to backing material in said heterogeneous mixture to form a secondary heterogeneous mixture comprised of said polymeric fibers and backing material; and then
   (ii) separating said polymeric fibers from said backing material in said secondary heterogeneous mixture.

5. A process as in claim 4, wherein step (ii) includes the step of introducing said secondary heterogeneous mixture to a secondary air elutriator to separate said mixture into a secondary light fraction predominantly comprised of said polymeric fibers and a secondary heavies fraction predominantly comprised of said backing material.

6. A process as in claim 5, further comprising the steps of:
   separately screening said primary and secondary light fractions to respectively obtain primary and secondary overs screening fractions comprised predominantly of said polymeric fibers; and
   combining said respective primary and secondary overs screening fractions.

7. A process as in claim 7, wherein said separate screening of said primary and secondary heavies fractions respectively forms separate primary and secondary unders screening fractions, and wherein said process includes combining said separate primary and secondary unders screening fractions, and feeding said combined primary and secondary unders screening fractions to a sifter to separate residual polymeric fibers therefrom.

8. A process as in claim 7, wherein said polymeric fibers separated by said sifter are combined with said primary and secondary overs screening fractions to form a discharge stream comprised of at least 80 wt. % of said polymeric fibers.

9. A process as in claim 9, wherein said discharge stream is subjected to at least one downstream operation selected from pelletizing and baling.

10. A process for reclaiming nylon from carpeting having nylon fibers bound to non-nylon backing material, said process comprising the steps of:
    (a) shredding the carpeting into strips;

(b) dismantling said carpeting strips in a primary dismantling operation to form a loose heterogeneous mixture comprised of nylon fibers and backing material;

(c) granulating said loose heterogeneous mixture to form a particulate mixture comprised of nylon fiber particulates and backing material particulates;

(d) introducing said particulate mixture to a primary air elutriator to separate said particulate mixture into a primary light fraction predominantly comprised of said nylon particulates and a primary heavies fraction predominantly comprised of said backing material particulates;

(e) transferring said primary light fraction to a primary screening operation to separate substantially any remaining backing material particulates contained therein from said nylon particulates and obtain a primary screening discharge stream comprised predominantly of said separated nylon particulates;

(f) subjecting said primary heavies fraction obtained in step (d) to a secondary dismantling operation to dismantle substantially any nylon fibers remaining bound to said backing material therein and form a secondary loose heterogeneous mixture of nylon and backing material particulates;

(g) introducing said secondary loose heterogenous mixture obtained according to step (f) to a secondary air elutriator to form a secondary light fraction predominantly comprised of said nylon particulates and a secondary heavies fraction predominantly comprised of said backing material particulates;

(h) transferring said secondary light fraction to a secondary screening operation to separate substantially any remaining backing material particulates contained therein from said nylon particulates and obtain a secondary screening discharge stream comprised predominantly of said separated nylon particulates; and (i) combining said primary and secondary screening discharge streams, whereby a substantial portion of nylon obtained from nylon fibers of said carpeting is reclaimed.

11. A process as in claim 10, wherein primary dismantling operation of step (b) includes impacting said carpeting strips against an anvil structure with hammer elements so as to dismantle substantially said carpeting strips and form said loose heterogeneous 12. A process as in claim 10 or 11, wherein said secondary dismantling operation of step (f) includes impacting said primary heavies fraction obtained from said primary air elutriator against an anvil bars with hammer elements so as to dismantle substantially any polymeric fibers remaining bound to backing material to form said secondary heterogeneous mixture.

13. A process as in claim 12, wherein each of steps (b) and (f) is practiced using a hammermill.

14. A process as in claim 10, wherein said primary and secondary screening operations each respectively forms separate primary and secondary unders screening fractions comprised predominantly of backing material particulates, and wherein said process includes combining said separate primary and secondary unders screening fractions, and feeding said combined primary and secondary unders screening fractions to a sifter to separate residual nylon fibers therefrom.

15. A process as in claim 14, wherein said residual nylon fibers separated by said sifter are combined with said primary and secondary screening discharge streams to form a combined discharge stream comprised of at least 80 wt. % nylon.

16. A system for reclaiming polymeric fibers from carpeting having polymeric fiber tufts bound to a backing material, comprising:

(a) a shredder for shredding the carpeting into strips;

(b) a hammermill having an anvil structure, a rotor, and a series of circumferentially spaced-apart elongate hammer bars fixed to said rotor, said hammer bars impacting said carpeting strips against said anvil structure upon rotation of said rotor so as to dismantle substantially said carpeting strips and form a heterogeneous mixture loosely comprised of said polymeric fiber tufts and said backing material;

(c) a granulator for receiving and granulating said heterogeneous mixture to form a particulate mixture of polymeric fiber particulates and backing material particulates; and (d) at least one separation operation for separating said polymeric fiber particulates from said backing material particulates.

17. A system as in claim 16, wherein said at least one separation operation includes a primary air elutriator to separate said heterogeneous mixture into a primary light fraction predominantly comprised of said polymeric fibers and a primary heavies fraction predominantly comprised of said backing material.

18. A system as in claim 17, further comprising:

(i) a secondary hammermill for impacting said primary heavies fraction obtained from said primary air elutriator against a secondary anvil structure with secondary hammer elements so as to dismantle substantially any polymeric fibers remaining bound to backing material in said heterogeneous mixture to form a secondary heterogeneous mixture comprised of said polymeric fibers and backing material; and then (ii) a secondary air elutriator for separating said polymeric fibers from said backing material in said secondary heterogeneous mixture.

19. A system as in claim 18, further comprising:

primary and secondary screening operations for separately screening said primary and secondary light fractions to respectively obtain primary and secondary screening discharge fractions comprised predominantly of said polymeric fibers: and wherein said primary and secondary screening operations include respective discharge lines which combine said respective primary and secondary screening discharge fractions.

20. A system as in claim 19, wherein said primary and secondary screening operations each respectively forms separate primary and secondary unders screening fractions comprised predominantly of backing material particulates, and wherein said primary and secondary screening operation further includes primary and secondary unders discharge chutes for combining said separate primary and secondary unders screening fractions, and a sifter connected to said primary and secondary unders discharge chutes for receiving said primary and secondary unders screening fractions to separate residual polymeric fibers therefrom.

21. A system as in claim 16, further comprising at least one of a pelletizer and a baler for the reclaimed polymeric material.

22. A system for reclaiming nylon from carpeting having nylon fibers bound to non-nylon backing material, said system comprising:

(a) a shredder for shredding the post-consumer carpeting into strips;

(b) a primary dismantling system for dismantling said carpeting strips to form a loose heterogeneous mixture comprised of nylon fibers and backing material;

(c) a granulator for receiving and granulating said loose heterogeneous mixture from said primary dismantling system to form a particulate mixture comprised of nylon fiber particulates and backing material particulates;

(d) a primary air elutriator to separate said particulate mixture into a primary light fraction predominantly comprised of said nylon particulates and a primary heavies fraction predominantly comprised of said backing material particulates;

(e) a primary screening operation which receives said primary light fraction from said primary air elutriator to separate substantially any remaining backing material particulates contained therein from said nylon particulates and obtain a primary screening discharge stream comprised predominantly of said separated nylon particulates;

(f) a secondary dismantling system which receives said primary heavies fraction from said primary air elutriator for dismantling substantially any nylon fibers remaining bound to said backing material therein and form a secondary loose heterogeneous mixture of nylon and backing material particulates;

(g) a secondary air elutriator which receives said secondary loose heterogeneous mixture from said secondary dismantling system to form a secondary light fraction thereof predominantly comprised of said nylon particulates and a secondary heavies fraction thereof predominantly comprised of said backing material particulates;

(h) a secondary screening operation for receiving said secondary light fraction from said secondary air elutriator to separate substantially any remaining backing material particulates contained therein from said nylon particulates and obtain a secondary screening discharge stream comprised predominantly of said separated nylon particulates; and (i) discharge chutes for combining said primary and secondary screening discharge streams, whereby a substantial portion of nylon obtained from the nylon fibers of said post-consumer carpeting is reclaimed.

23. A system as in claim 22, wherein said primary and secondary screening operations each respectively forms separate primary and secondary unders screening fractions comprised predominantly of backing material particulates, and wherein said primary and secondary screening operations further include primary and secondary unders discharge chutes for combining said separate primary and secondary unders screening fractions, and a sifter connected to said primary and secondary unders discharge chutes for receiving said primary and secondary unders screening fractions to separate residual polymeric fibers therefrom.

24. A system as in claim 22, which further comprises at least one of a pelletizer and a baler for the reclaimed nylon.

25. A system as in claim 22, wherein said primary and secondary dismantling systems include a hammermill.

* * * * *

UNITED STATES PATENT AND TRADEMARK OFFICE
CERTIFICATE OF CORRECTION

PATENT NO. : 5,535,945
DATED : July 16, 1996
INVENTOR(S) : Randall A. Sferrazza et al.

It is certified that error appears in the above-indentified patent and that said Letters Patent is hereby corrected as shown below:

At column 11, line 46, please insert --mixture-- after "heterogeneous" and add a period (.) after "mixture".

Signed and Sealed this

Eighteenth Day of March, 1997

Attest:

BRUCE LEHMAN

Attesting Officer

Commissioner of Patents and Trademarks